(12) United States Patent
Tsai

(10) Patent No.: US 7,643,225 B1
(45) Date of Patent: Jan. 5, 2010

(54) OPTICAL LENS SYSTEM FOR TAKING IMAGE

(75) Inventor: Tsung-Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 12/360,591

(22) Filed: Jan. 27, 2009

(30) Foreign Application Priority Data

Nov. 20, 2008 (TW) .............................. 97144975 A

(51) Int. Cl.
*G02B 9/34* (2006.01)
*G02B 13/18* (2006.01)
(52) U.S. Cl. ..................... 359/715; 359/772; 359/771
(58) Field of Classification Search ......... 359/771–772, 359/747, 753, 763–764, 755–757, 733–734, 359/686, 681–682, 713–715; G02B 9/34
See application file for complete search history.

(56) References Cited

U.S. PATENT DOCUMENTS

| 7,466,497 | B2 * | 12/2008 | Park et al. ............... 359/715 |
| 2009/0109552 | A1 * | 4/2009 | You et al. ............... 359/772 |
| 2009/0128927 | A1 * | 5/2009 | Chen et al. ............... 359/715 |

* cited by examiner

*Primary Examiner*—Darryl J Collins
*Assistant Examiner*—Zachary Wilkes
(74) *Attorney, Agent, or Firm*—Banger Shia

(57) ABSTRACT

An optical lens system for taking image comprises, in order from the object side to the image side: a first lens element with positive refractive power; a second lens element with negative refractive power; a third lens element with negative refractive power having a convex object-side surface and a concave image-side surface; a fourth lens element with negative refractive power being provided with at least one aspheric surface. In the optical lens system for taking image, the number of lens elements with refractive power is limited to four. Such arrangements can reduce the volume and the sensitivity of the optical lens system while providing higher resolution.

25 Claims, 8 Drawing Sheets

OPTICAL LENS SYSTEM FOR TAKING IMAGE

BACKGROUND OF THE INVENTION

1. Field of the Invention

The present invention relates to an optical lens system for taking image, and more particularly to a miniaturized optical lens system for taking image used in a mobile phone camera.

2. Description of the Prior Art

In recent years, with the popularity of the mobile phone camera, the optical lens system for taking image has become thinner and thinner, and the electronic imaging sensor of a general digital camera is typically a CCD (Charge Coupled Device) or CMOS (Complementary Metal Oxide Semiconductor) sensor. Due to advances in semiconductor manufacturing, the pixel size of sensors has been reduced continuously, and miniaturized optical lens systems for taking image have increasingly higher resolution. Therefore, there's increasing demand for image quality.

A conventional mobile phone camera usually consists of three lens elements: from the object side to the image side: a first lens element with positive refractive power, a second lens element with negative refractive power and a third lens element with positive refractive power, such as the optical lens system for taking image described in U.S. Pat. No. 7,145,736.

As the pixel size of electronic imaging sensors gradually becomes smaller and smaller, the system requires higher image quality. The conventional optical lens system comprising three lens elements cannot satisfy the requirements of higher resolution optical lens systems.

U.S. Pat. No. 7,365,920 discloses a four-piece lens assembly, in which the first lens element and the second lens element, both glass spherical lens elements, are bonded to each other to form a doublet lens element for eliminating chromatic aberration. However, it suffers from the following disadvantages: the degree of freedom available in the optical system is insufficient since there are too many glass spherical lens elements, making it difficult to reduce the length of the optical system; and the manufacturing difficulty is increased due to the difficult process of bonding the glass lens elements.

The present invention mitigates and/or obviates the aforementioned disadvantages.

SUMMARY OF THE INVENTION

The primary objective of the present invention is to provide an optical lens system for taking image comprising four lens elements to improve image quality, and effectively reduce the volume of the optical lens system.

An optical lens system for taking image in accordance with the present invention comprises: in order from the object side to the image side: a first lens element with positive refractive power; a second lens element with negative refractive power; a third lens element with negative refractive power having a convex object-side surface and a concave image-side surface; a fourth lens element with negative refractive power being provided with at least one aspheric surface. In the optical lens system for taking image, the number of lens elements with refractive power is limited to four. Such lens arrangements can effectively improve image quality.

In the present optical lens system for taking image, the refractive power of the system is mainly provided by the first lens element with positive refractive power. The second lens element with negative refractive power mainly serves to correct the chromatic aberration. The third lens element and the fourth lens element serve as correction lens elements to balance and correct various aberrations caused by the optical lens system. In addition, the third lens element and the fourth lens element are negative so that the principal point of the system will be far away from the image plane, so that the total track length of the optical lens system will be effectively reduced.

The first lens element provides a strong positive refractive power, and the aperture stop is located close to the object side, so that the total track length of the optical lens system can be effectively reduced, and the exit pupil of the optical lens system will be far away from the image plane. Therefore, the light will be projected onto the sensor with a relatively small incident angle, this is the telecentric feature of the image side, and this feature is very important to the photosensitive power of current solid-state sensors, since they are more sensitive when the light is incident at a small angle. This also reduces the probability of the occurrence of shading. The inflection points formed on the third lens element and the fourth lens element will contribute to a better correction of the incident angle of the off axis light with respect to the sensor.

In addition, in wide angle optical systems, it is especially necessary to correct the distortion and the chromatic aberration of magnification, and this can be solved by locating the aperture stop at the balance point of the refractive power of the system. In the present optical lens system for taking image, if the aperture stop is located in front of the first lens element, the telecentric feature of the optical lens system becomes emphasized, the total track length of the optical lens system will become shorter. If the aperture stop is located between the first and second lens elements, the wide field of view becomes emphasized, and the optical system is less sensitive as well.

With the trend of miniaturization of the optical lens system and the requirement of increasing the field of view, the focal length of the optical lens system is becoming very short. Therefore, the radius of curvature and the size of the lens elements must be very small, and it is difficult to make such glass lens elements by the use of conventional grinding. Plastic material is introduced to make lens elements by injection molding, using a relatively low cost to produce high precision lens elements. The lens elements are provided with aspheric surfaces, allowing more design parameters (than spherical surfaces), so as to better reduce the aberration and the number of the lens elements, thus effectively reducing the total track length of the optical lens system.

According to one aspect of the present invention, in the present optical lens system for taking image, the focal length of the optical lens system for taking image is f, the focal length of the third lens element is f3, and they satisfy the relation:

$$|f/f3|<0.5.$$

If f/f3 satisfies the above relation, the third lens element serves as a correction lens element to balance and correct various aberration caused by the optical lens system, it will be favorable to correct the astigmatism and the distortion caused by the optical lens system, improving the resolution of the optical lens system. Further, it will be better if f/f3 satisfies the relation:

$$|f/f3|<0.2.$$

According to another aspect of the present invention, in the present optical lens system for taking image, the Abbe number of the first lens element is V1, the Abbe number of the second lens element is V2, and they satisfy the relation:

$$25.2<V1-V2<35.0.$$

If V1 and V2 satisfy the above relation, the chromatic aberration of the optical lens system can be effectively corrected, improving the image quality of the optical lens system. Further, it will be better if V1 and V2 satisfy the relations:

$$30.6 < V1 - V2 < 34.0;$$

$$V2 < 25.0.$$

According to another aspect of the present invention, in the present optical lens system for taking image, the focal length of the optical lens system for taking image is f, the on-axis distance between the second lens element and the third lens element is T23, and they satisfy the relation:

$$(T23/f)*100 > 3.5.$$

If T23/f satisfies the above relation, it will be favorable to correct the high order aberrations of the system.

According to another aspect of the present invention, in the present optical lens system for taking image, the inflection points formed on the object-side surface of the second lens element can effectively correct the off-axis aberration of the system.

According to another aspect of the present invention, in the present optical lens system for taking image, the radius of curvature of the object-side surface of the second lens element is R3, the radius of curvature of the image-side surface of the second lens element is R4, and they satisfy the relation:

$$R3/R4 > 3.0.$$

If the value of R3/R4 is smaller than the above lower limit, it will be difficult to correct the chromatic aberration caused by the system.

According to another aspect of the present invention, in the present optical lens system for taking image, the on-axis distance between the first lens element and the second lens element is T12, the focal length of the optical lens system for taking image is f, and they satisfy the relation:

$$0.6 < (T12/f)*100 < 5.0.$$

If T12/f satisfies the above relation, it can allow better correction of the high order aberrations of the system.

According to another aspect of the present invention, in the present optical lens system for taking image, the refractive index of the first lens element is N1, and it satisfies the relation:

$$1.50 < N1 < 1.58.$$

If N1 satisfies the above relation, the plastic optical material with the refractive index within the above range will better match the optical lens system.

According to another aspect of the present invention, in the present optical lens system for taking image, the radius of curvature of the object-side surface of the third lens element is R5, the radius of curvature of the image-side surface of the third lens element is R6, the radius of curvature of the object-side surface of the fourth lens element is R7, the radius of curvature of the image-side surface of the fourth lens element is R8, and they satisfy the relations:

$$1.1 < R5/R6 < 1.3;$$

$$1.1 < R7/R8 < 1.3.$$

If R5/R6 and R7/R8 satisfy the above relations, the third lens element and the fourth lens element serve as correction lens elements to correct the high order aberrations of the system, improving the image quality of the optical lens system.

According to another aspect of the present invention, in the present optical lens system for taking image, an object to be photographed is imaged on an electronic imaging sensor, the total track length of the system is TTL, the image height of the system is Imgh, and they satisfy the relation:

$$TTL/ImgH < 1.95.$$

The above relation can maintain the objective of miniaturization of the optical lens system for taking image.

DETAILED DESCRIPTION OF THE PREFERRED EMBODIMENTS

Figure 1A:
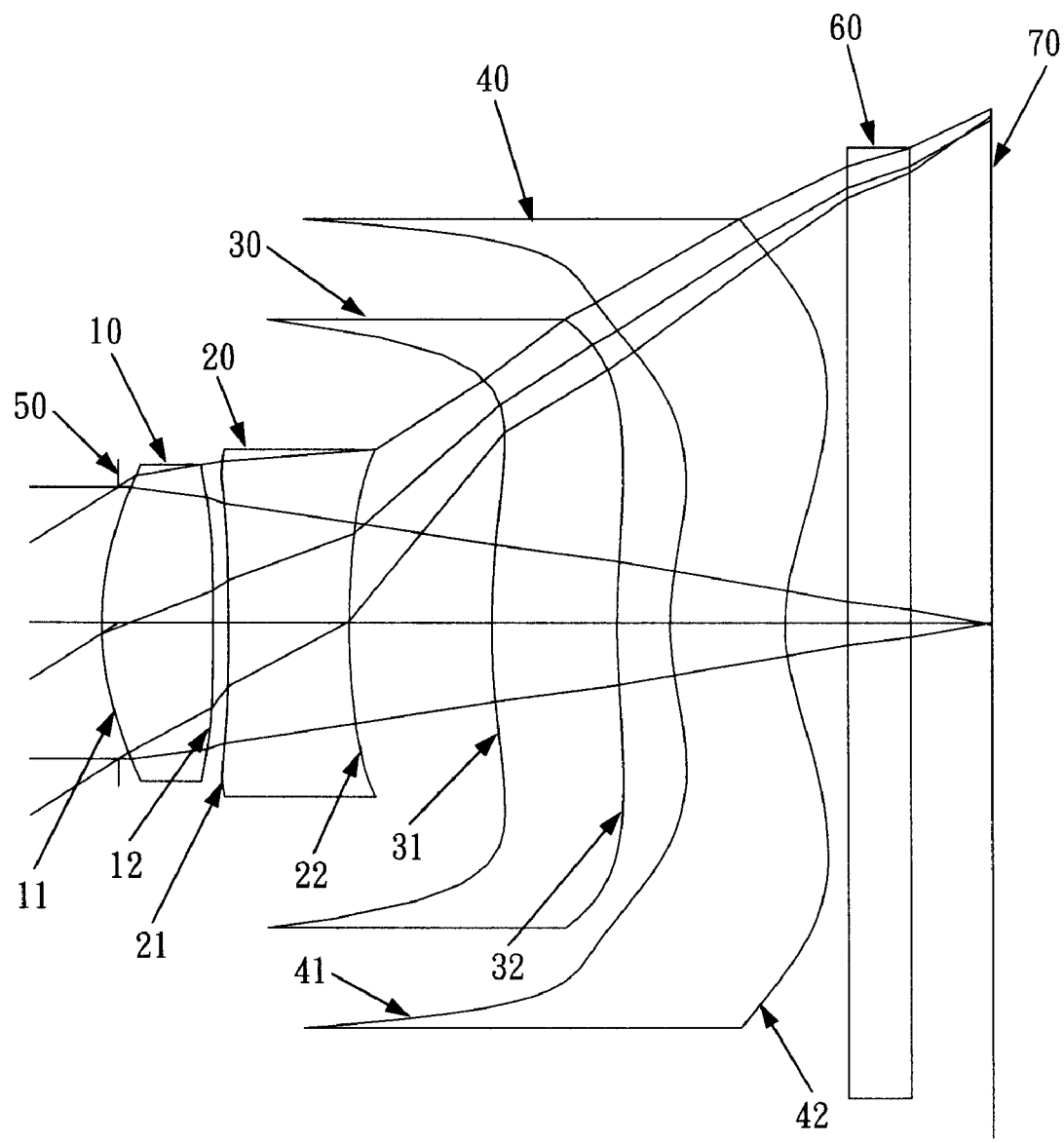
FIG. 1A shows an optical lens system for taking image in accordance with a first embodiment of the present invention.
Figure 1B:
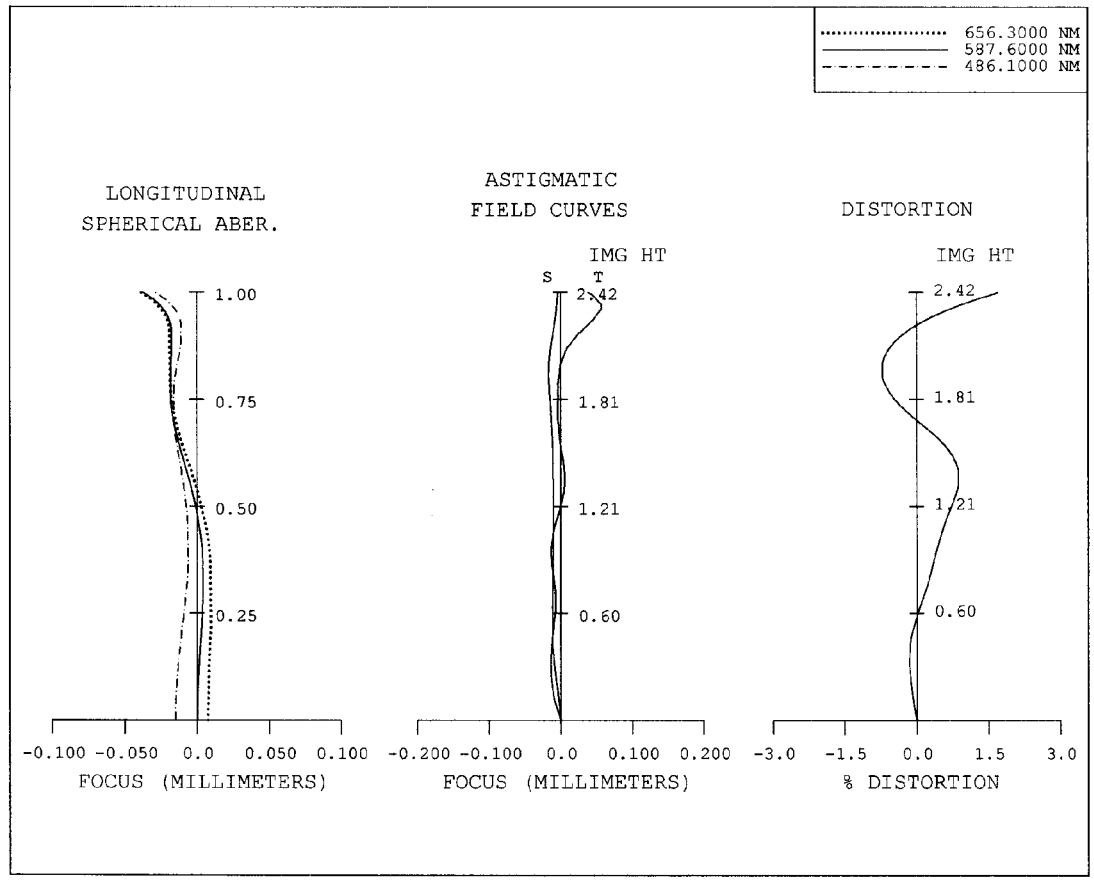
FIG. 1B shows the aberration curves of the first embodiment of the present invention.

Referring to FIG. 1A, which shows an optical lens system for taking image in accordance with a first embodiment of the present invention, and FIG. 1B shows the aberration curves of the first embodiment of the present invention. An optical lens system for taking image in accordance with the first embodiment of the present invention comprises: in order from the object side to the image side:

A plastic first lens element 10 with positive refractive power has a convex object-side surface 11 and a concave image-side surface 12, and the object-side surface 11 and the image-side surface 12 of the first lens element 10 are aspheric.

A plastic second lens element 20 with negative refractive power has a convex object-side surface 21 and a concave image-side surface 22, the object-side surface 21 and the image-side surface 22 of the second lens element 20 are aspheric, and inflection points are formed on the object-side surface 21 of the second lens element 20.

A plastic third lens element 30 with negative refractive power has a convex object-side surface 31 and a concave image-side surface 32, the object-side surface 31 and the image-side surface 32 of the third lens element 30 are aspheric, and inflection points are formed on the object-side surface 31 and the image-side surface 32 of the third lens element 30.

A plastic fourth lens element 40 with negative refractive power has a convex object-side surface 41 and a concave image-side surface 42, the object-side surface 41 and the image-side surface 42 of the fourth lens element 40 are aspheric, and inflection points are formed on the object-side surface 41 and the image-side surface 42 of the fourth lens element 40.

An aperture stop 50.

An IR cut filter 60 is located behind the fourth lens element 40 and has no influence on the focal length of the optical lens system.

An image plane 70 is located behind the IR cut filter 60.

The equation for the aspheric surface profiles of the first embodiment is expressed as follows:

$$X(Y) = (Y^2/R)/\left(1 + sqrt\left(1 - (1+k)*(Y/R)^2\right)\right) + \sum_i (Ai)*(Y^i)$$

wherein:

X: the height of a point on the aspheric lens surface at a distance Y from the optical axis relative to the tangential plane at the aspheric surface vertex;

Y: the distance from the point on the curve of the aspheric surface to the optical axis;

k: the conic coefficient;

Ai: the aspheric surface coefficient of order i.

In the first embodiment of the present optical lens system for taking image, the focal length of the optical lens system for taking image is f, the focal length of the third lens element is f3, and they satisfy the relations:

f=3.67 mm;

|f/f3|=0.05.

In the first embodiment of the present optical lens system for taking image, the focal length of the optical lens system for taking image is f, the on-axis distance between the first lens element and the second lens element is T12, the on-axis distance between the second lens element and the third lens element is T23, and they satisfy the relations:

(T12/f)*100=2.0

(T23/f)*100=18.6.

In the first embodiment of the present optical lens system for taking image, the refractive index of the first lens element is N1, and it satisfies the relation:

N1=1.544.

In the first embodiment of the present optical lens system for taking image, the Abbe number of the first lens element is V1, the Abbe number of the second lens element is V2, and they satisfy the relations:

V2=23.4;

V1−V2=32.5.

In the first embodiment of the present optical lens system for taking image, the radius of curvature of the object-side surface of the second lens element is R3, the radius of curvature of the image-side surface of the second lens element is R4, the radius of curvature of the object-side surface of the third lens element is R5, the radius of curvature of the image-side surface of the third lens element is R6, the radius of curvature of the object-side surface of the fourth lens element is R7, the radius of curvature of the image-side surface of the fourth lens element is R8, and they satisfy the relations:

R3/R4=14.52;

R5/R6=1.16;

R7/R8=1.22.

In the first embodiment of the present optical lens system for taking image, an object to be photographed is imaged on an electronic imaging sensor, the total track length of the system is TTL, the image height of the system is Imgh, and they satisfy the relation:

TTL/ImgH=1.76.

The detailed optical data of the first embodiment is shown in table 1, and the aspheric surface data is shown in table 2, wherein the units of the radius of curvature, the thickness and the focal length are expressed in mm, and HFOV is half of the maximal field of view.

TABLE 1

(Embodiment 1)
f(focal length) = 3.67 mm, Fno = 2.8, HFOV (half of field of view) = 33.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.079 | | | | |
| 2 | Lens 1 | 1.51538(ASP) | 0.527 | Plastic | 1.544 | 55.9 | 2.86 |
| 3 | | 50.00000(ASP) | 0.073 | | | | |
| 4 | Lens 2 | 50.00000(ASP) | 0.580 | Plastic | 1.632 | 23.4 | −5.88 |
| 5 | | 3.44250(ASP) | 0.684 | | | | |
| 6 | Lens 3 | 3.81180(ASP) | 0.599 | Plastic | 1.544 | 55.9 | −73.42 |
| 7 | | 3.28710(ASP) | 0.252 | | | | |
| 8 | Lens 4 | 1.23700(ASP) | 0.556 | Plastic | 1.514 | 56.8 | −72.42 |
| 9 | | 1.01460(ASP) | 0.300 | | | | |
| 10 | IR-filter | Plano | 0.300 | Glass | 1.517 | 64.2 | |
| 11 | | Plano | 0.386 | | | | |
| 12 | Image | Plano | | | | | |

TABLE 2

Aspheric Coefficients

| | Surface # | | | | |
|---|---|---|---|---|---|
| | 2 | 3 | 4 | 5 | 7 |
| k = | −5.13663E+00 | −1.00000E+00 | −1.00000E+00 | −4.39965E+00 | −1.00000E+02 |
| A4 = | 1.53617E−01 | −3.12081E−01 | −3.16152E−01 | −4.39472E−02 | −8.35248E−02 |
| A6 = | −1.27962E−01 | 1.91343E−01 | 3.63725E−01 | 1.54627E−01 | 5.44434E−02 |
| A8 = | 1.08041E−01 | 1.00841E−01 | −1.11663E−01 | −5.92434E−02 | −2.52417E−02 |
| A10 = | −3.39184E−01 | −1.40160E−01 | 2.42472E−01 | 8.60832E−02 | −5.15593E−03 |
| A12 = | 1.45082E−01 | −2.42513E−02 | 4.37432E−02 | 2.94293E−02 | 3.35439E−03 |
| A14 = | 1.64510E−01 | 8.19930E−02 | −4.35646E−02 | −2.37080E−03 | −3.92832E−04 |
| A16 = | 1.96686E−01 | 3.33814E−01 | −1.85699E−01 | −4.22691E−02 | |

| | Surface # | | |
|---|---|---|---|
| | 6 | 8 | 9 |
| k = | 4.30199E+00 | −1.22186E+00 | −3.14835E+00 |
| A1 = | | | |
| A2 = | | | |
| A3 = | | | |
| A4 = | −4.60552E−02 | −6.80733E−01 | −2.98953E−01 |
| A5 = | | | |
| A6 = | −6.57535E−02 | 5.56282E−01 | 2.30102E−01 |
| A7 = | | | |
| A8 = | 6.11730E−02 | −3.46545E−01 | −1.16085E−01 |
| A9 = | | | |
| A10 = | −4.21537E−02 | 1.23560E−01 | 3.08330E−02 |
| A11 = | | | |
| A12 = | | −1.95882E−02 | −3.94254E−03 |
| A13 = | | | |
| A14 = | | 8.25495E−04 | 1.90488E−04 |

Figure 2A:
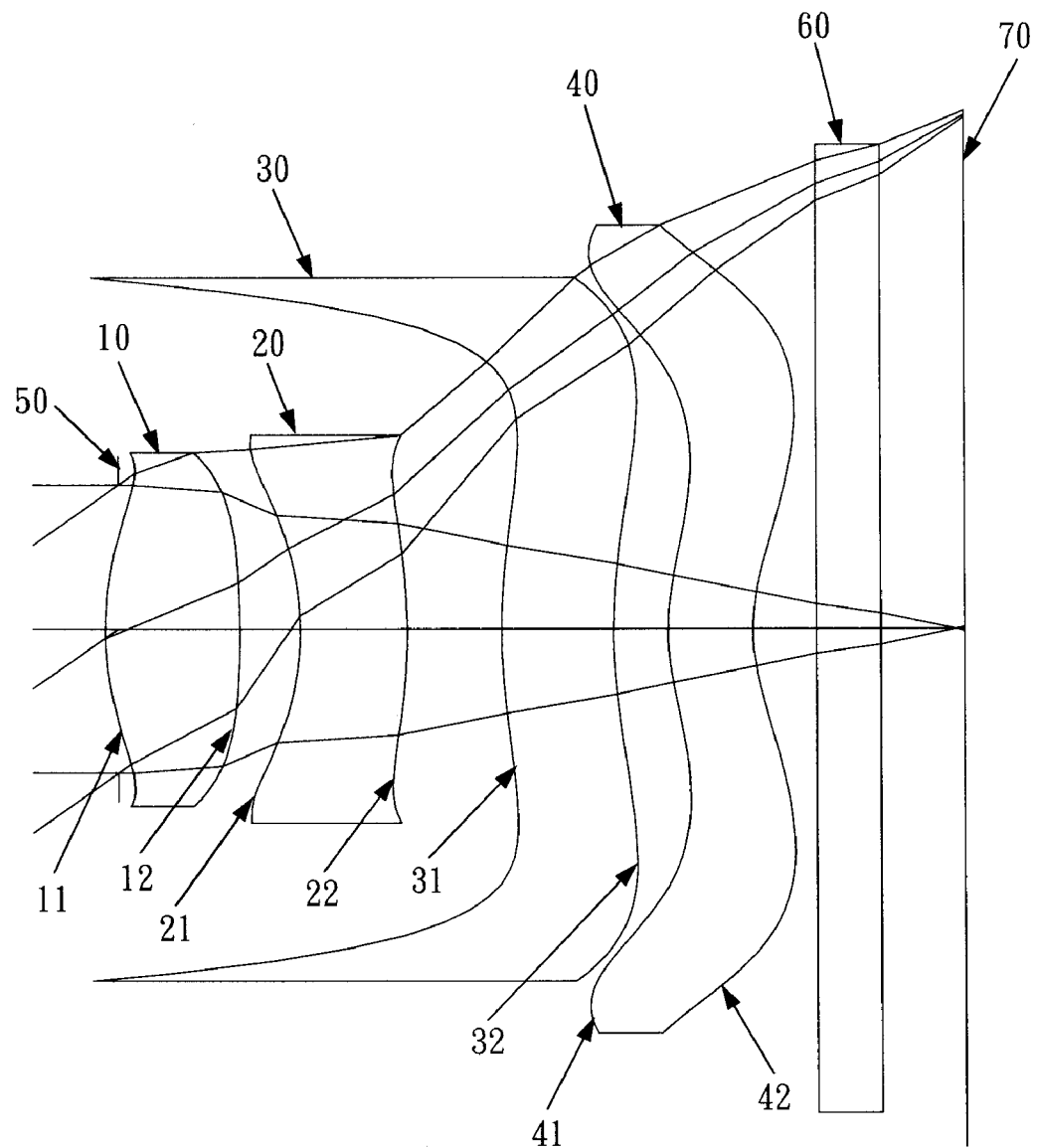
FIG. 2A shows an optical lens system for taking image in accordance with a second embodiment of the present invention.
Figure 2B:
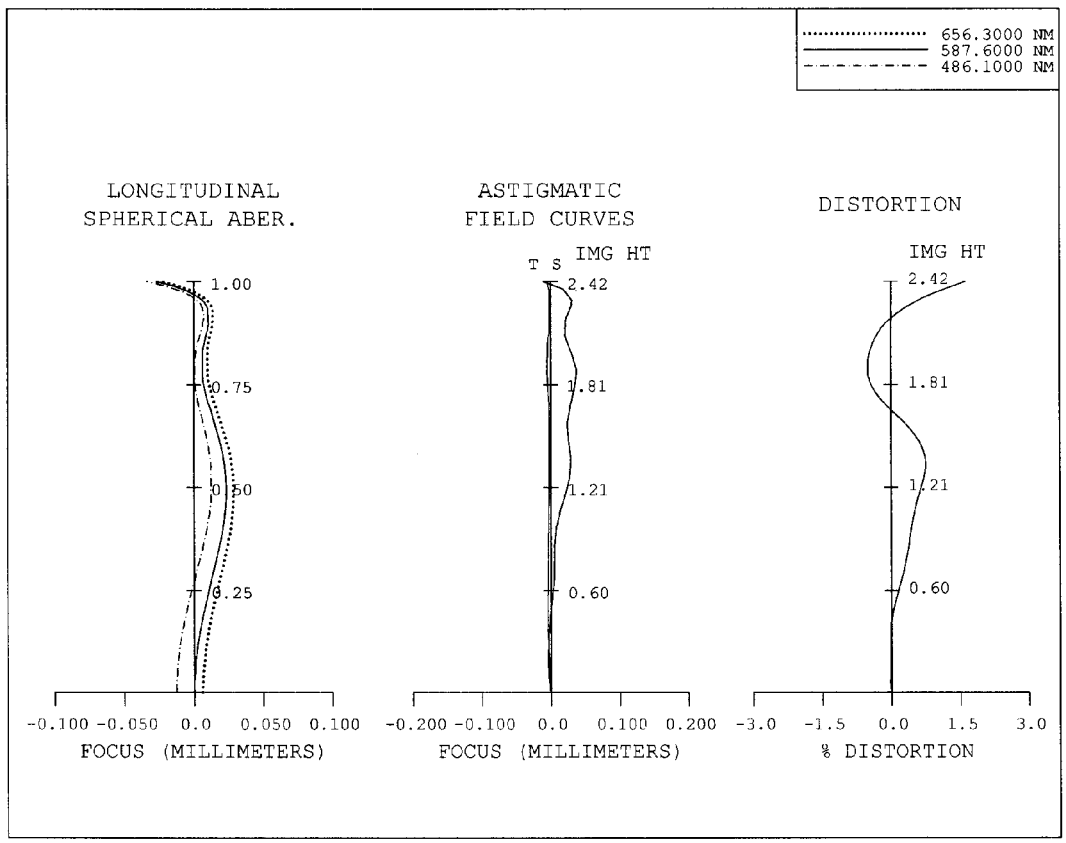
FIG. 2B shows the aberration curves of the second embodiment of the present invention.

Referring to FIG. 2A, which shows an optical lens system for taking image in accordance with a second embodiment of the present invention, and FIG. 2B shows the aberration curves of the second embodiment of the present invention. The second embodiment of the present invention comprises: in order from the object side to the image side:

A plastic first lens element 10 with positive refractive power has a convex object-side surface 11 and a convex image-side surface 12, and the object-side surface 11 and the image-side surface 12 of the first lens element 10 are aspheric.

A plastic second lens element 20 with negative refractive power has a concave object-side surface 21 and a convex image-side surface 22, the object-side surface 21 and the image-side surface 22 of the second lens element 20 are aspheric, and inflection points are formed on the object-side surface 21 of the second lens element 20.

A plastic third lens element 30 with negative refractive power has a convex object-side surface 31 and a concave image-side surface 32, the object-side surface 31 and the image-side surface 32 of the third lens element 30 are aspheric, and inflection points are formed on the object-side surface 31 and the image-side surface 32 of the third lens element 30.

A plastic fourth lens element 40 with negative refractive power has a convex object-side surface 41 and a concave image-side surface 42, the object-side surface 41 and the image-side surface 42 of the fourth lens element 40 are aspheric, and inflection points are formed on the object-side surface 41 and the image-side surface 42 of the fourth lens element 40.

An aperture stop 50.

An IR cut filter 60 is located behind the fourth lens element 40 and has no influence on the focal length of the optical lens system.

An image plane 70 is located behind the IR cut filter 60.

The equation for the aspheric surface profiles of the second embodiment has the same form as that of the first embodiment.

In the second embodiment of the present optical lens system for taking image, the focal length of the optical lens system for taking image is f, the focal length of the third lens element is f3, and they satisfy the relations:

$f = 3.36$ mm;

$|f/f3| = 0.10$.

In the second embodiment of the present optical lens system for taking image, the focal length of the optical lens system for taking image is f, the on-axis distance between the first lens element and the second lens element is T12, the on-axis distance between the second lens element and the third lens element is T23, and they satisfy the relations:

$(T12/f)*100 = 8.5$ $(T23/f)*100 = 13.2$.

In the second embodiment of the present optical lens system for taking image, the refractive index of the first lens element is N1, and it satisfies the relation:

$N1 = 1.544$.

In the second embodiment of the present optical lens system for taking image, the Abbe number of the first lens element is V1, the Abbe number of the second lens element is V2, and they satisfy the relations:

$V2=23.4$;

$V1-V2=32.5$.

In the second embodiment of the present optical lens system for taking image, the radius of curvature of the object-side surface of the second lens element is R3, the radius of curvature of the image-side surface of the second lens element is R4, the radius of curvature of the object-side surface of the third lens element is R5, the radius of curvature of the image-side surface of the third lens element is R6, the radius of curvature of the object-side surface of the fourth lens element is R7, the radius of curvature of the image-side surface of the fourth lens element is R8, and they satisfy the relations:

$R3/R4=0.50$;

$R5/R6=1.24$;

$R7/R8=1.21$.

In the second embodiment of the present optical lens system for taking image, an object to be photographed is imaged on an electronic imaging sensor, the total track length of the system is TTL, the image height of the system is Imgh, and they satisfy the relation:

$TTL/ImgH=1.66$.

The detailed optical data of the second embodiment is shown in table 3, and the aspheric surface data is shown in table 4, wherein the units of the radius of curvature, the thickness and the focal length are expressed in mm, and HFOV is half of the maximal field of view.

TABLE 3

(Embodiment 2)
f(focal length = 3.36 mm, Fno = 2.45, HFOV (half of field of view) = 35.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.060 | | | | |
| 2 | Lens 1 | 1.54484(ASP) | 0.627 | Plastic | 1.544 | 55.9 | 2.27 |
| 3 | | −5.29770(ASP) | 0.284 | | | | |
| 4 | Lens 2 | −1.39141(ASP) | 0.500 | Plastic | 1.632 | 23.4 | −5.14 |
| 5 | | −2.77443(ASP) | 0.442 | | | | |
| 6 | Lens 3 | 2.72988(ASP) | 0.523 | Plastic | 1.530 | 55.8 | −33.27 |
| 7 | | 2.20703(ASP) | 0.257 | | | | |
| 8 | Lens 4 | 1.13726(ASP) | 0.399 | Plastic | 1.544 | 55.9 | −33.16 |
| 9 | | 0.93756(ASP) | 0.300 | | | | |
| 10 | IR-filter | Plano | 0.300 | Glass | 1.517 | 64.2 | |
| 11 | | Plano | 0.392 | | | | |
| 12 | Image | Plano | | | | | |

TABLE 4

Aspheric Coefficients

| | Surface # | | | | |
|---|---|---|---|---|---|
| | 2 | 3 | 4 | 5 | 7 |
| k = | −5.53255E+00 | 6.38809E+00 | 1.21884E+00 | 5.42590E+00 | −3.01061E+01 |
| A4 = | 1.28420E−01 | −1.79386E−01 | −5.35538E−02 | −3.77510E−03 | 6.84213E−03 |
| A6 = | −2.01356E−01 | −1.42295E−01 | 5.01720E−01 | 3.50685E−01 | −3.04665E−02 |
| A8 = | 1.81403E−01 | −4.44714E−02 | −6.47578E−01 | −2.21828E−01 | 1.43383E−02 |
| A10 = | −6.01302E−01 | −2.25945E−02 | 7.63205E−01 | 1.76997E−01 | −9.40929E−03 |
| A12 = | | | | | 2.60630E−03 |
| A14 = | | | | | −2.58440E−04 |

| | Surface # | | |
|---|---|---|---|
| | 6 | 8 | 9 |
| k = | −7.89116E−01 | −1.56630E+00 | −3.40421E+00 |
| A1 = | | | |
| A2 = | | | |
| A3 = | | | |
| A4 = | −1.23612E−01 | −6.35756E−01 | −3.09660E−01 |
| A5 = | | | |
| A6 = | 3.60447E−02 | 5.72114E−01 | 2.36697E−01 |
| A7 = | | | |
| A8 = | −1.68977E−02 | −3.55406E−01 | −1.19986E−01 |
| A9 = | | | |

TABLE 4-continued

Aspheric Coefficients

| | Surface # | | |
|---|---|---|---|
| A10 = | −8.36898E−03 | 1.20839E−01 | 3.04869E−02 |
| A11 = | | | |
| A12 = | | −1.97397E−02 | −3.78247E−03 |
| A13 = | | | |
| A14 = | | 1.22445E−03 | 2.04583E−04 |

Figure 3A:
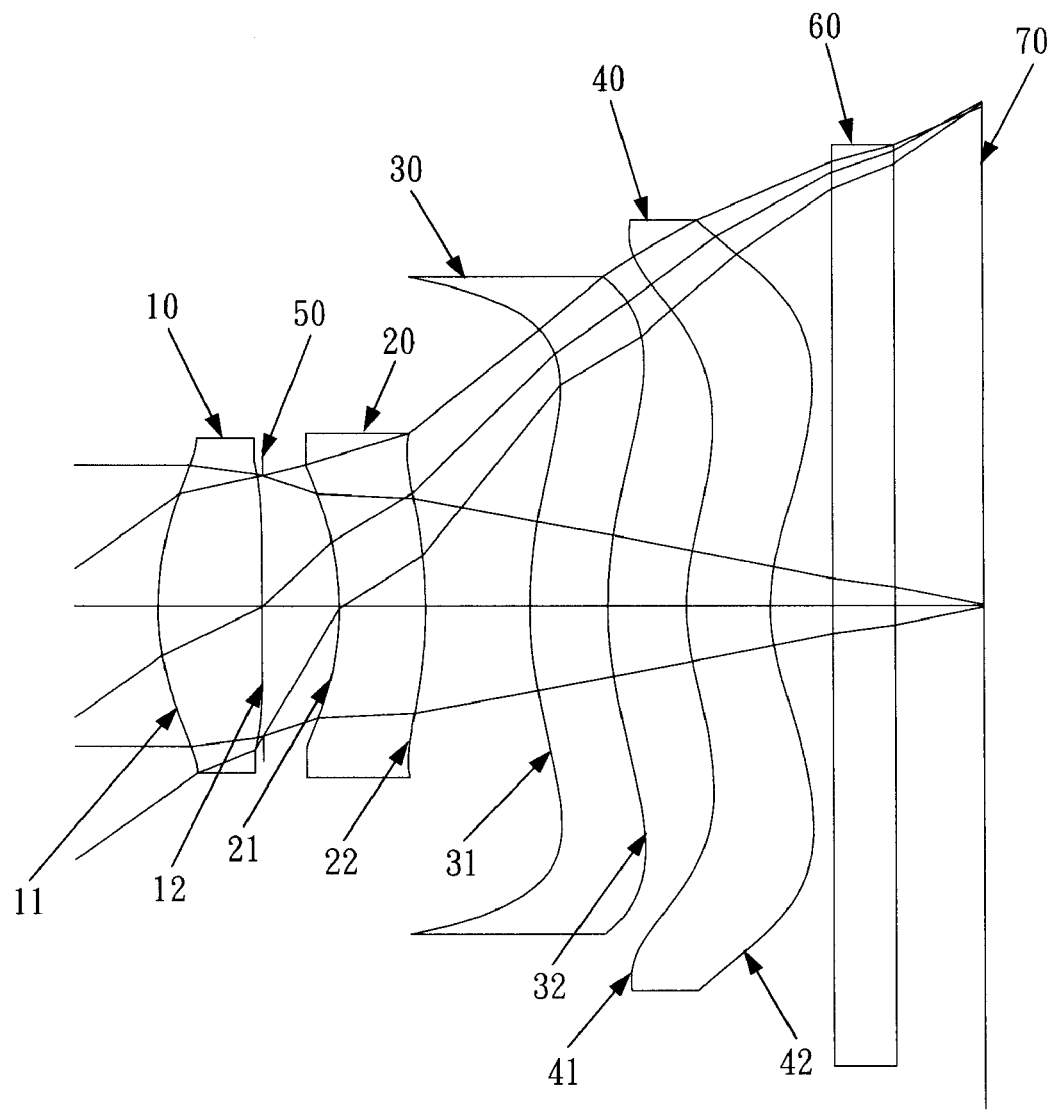
FIG. 3A shows an optical lens system for taking image in accordance with a third embodiment of the present invention.
Figure 3B:
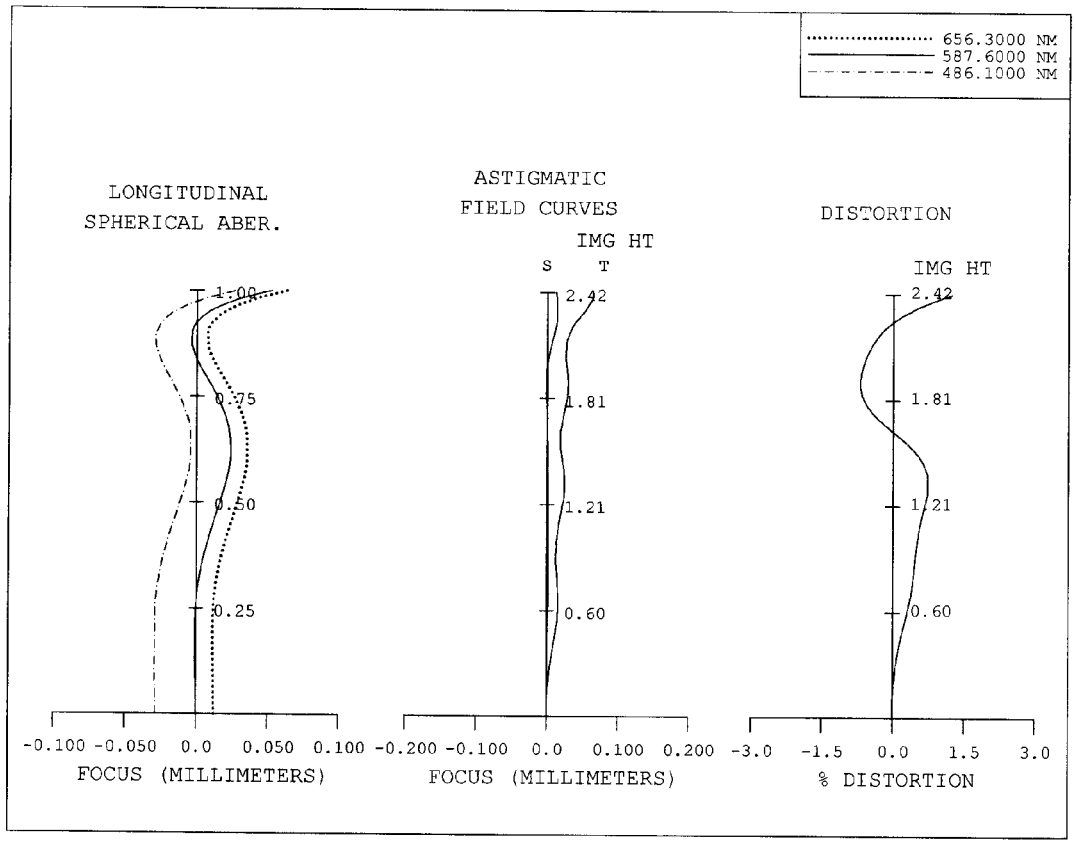
FIG. 3B shows the aberration curves of the third embodiment of the present invention.

Referring to FIG. 3A, which shows an optical lens system for taking image in accordance with a third embodiment of the present invention, FIG. 3B shows the aberration curves of the third embodiment of the present invention. The third embodiment of the present invention comprises: in order from the object side to the image side:

A plastic first lens element 10 with positive refractive power has a convex object-side surface 11 and a concave image-side surface 12, and the object-side surface 11 and the image-side surface 12 of the first lens element 10 are aspheric.

A plastic second lens element 20 with negative refractive power has a concave object-side surface 21 and a convex image-side surface 22, and the object-side surface 21 and the image-side surface 22 of the second lens element 20 are aspheric.

A plastic third lens element 30 with negative refractive power has a convex object-side surface 31 and a concave image-side surface 32, the object-side surface 31 and the image-side surface 32 of the third lens element 30 are aspheric, and inflection points are formed on the object-side surface 31 and the image-side surface 32 of the third lens element 30.

A plastic fourth lens element 40 with negative refractive power has a convex object-side surface 41 and a concave image-side surface 42, the object-side surface 41 and the image-side surface 42 of the fourth lens element 40 are aspheric, and inflection points are formed on the object-side surface 41 and the image-side surface 42 of the fourth lens element 40.

An aperture stop 50 is located between the first lens element 10 and the second lens element 20.

An IR cut filter 60 is located behind the fourth lens element 40 and has no influence on the focal length of the optical lens system.

An image plane 70 is located behind the IR cut filter 60.

The equation for the aspheric surface profiles of the third embodiment has the same form as that of the first embodiment.

In the third embodiment of the present optical lens system for taking image, the focal length of the optical lens system for taking image is f, the focal length of the third lens element is f3, and they satisfy the relations:

$f=3.34$ mm;

$|f/f3|=0.05$.

In the third embodiment of the present optical lens system for taking image, the focal length of the optical lens system for taking image is f, the on-axis distance between the first lens element and the second lens element is T12, the on-axis distance between the second lens element and the third lens element is T23, and they satisfy the relations:

$(T12/f)*100=11.1$;

$(T23/f)*100=14.9$.

In the third embodiment of the present optical lens system for taking image, the refractive index of the first lens element is N1, and it satisfies the relation:

$N1=1.544$.

In the third embodiment of the present optical lens system for taking image, the Abbe number of the first lens element is V1, the Abbe number of the second lens element is V2, and they satisfy the relations:

$V2=30.2$;

$V1-V2=25.7$.

In the third embodiment of the present optical lens system for taking image, the radius of curvature of the object-side surface of the second lens element is R3, the radius of curvature of the image-side surface of the second lens element is R4, the radius of curvature of the object-side surface of the third lens element is R5, the radius of curvature of the image-side surface of the third lens element is R6, the radius of curvature of the object-side surface of the fourth lens element is R7, the radius of curvature of the image-side surface of the fourth lens element is R8, and they satisfy the relations:

$R3/R4=0.65$;

$R5/R6=1.13$;

$R7/R8=1.18$.

In the third embodiment of the present optical lens system for taking image, an object to be photographed is imaged on an electronic imaging sensor, the total track length of the system is TTL, the image height of the system is Imgh, and they satisfy the relation:

$TTL/ImgH=1.63$.

The detailed optical data of the third embodiment is shown in table 5, and the aspheric surface data is shown in table 6, wherein the units of the radius of curvature, the thickness and the focal length are expressed in mm, and HFOV is half of the maximal field of view.

TABLE 5

(Embodiment 3)
f(focal length = 3.34 mm, Fno = 2.45, HFOV (half of field of view) = 35.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.43006(ASP) | 0.491 | Plastic | 1.544 | 55.9 | 2.73 |
| 2 | | 33.33330(ASP) | 0.004 | | | | |
| 3 | Aperture Stop | Plano | 0.366 | | | | |
| 4 | Lens 2 | −1.48914(ASP) | 0.414 | Plastic | 1.583 | 30.2 | −9.11 |
| 5 | | −2.28042(ASP) | 0.498 | | | | |
| 6 | Lens 3 | 2.06128(ASP) | 0.372 | Plastic | 1.530 | 55.8 | −65.88 |
| 7 | | 1.82470(ASP) | 0.377 | | | | |
| 8 | Lens 4 | 1.11987(ASP) | 0.401 | Plastic | 1.530 | 55.8 | −64.93 |
| 9 | | 0.95005(ASP) | 0.300 | | | | |
| 10 | IR-filter | Plano | 0.300 | Glass | 1.517 | 64.2 | |
| 11 | | Plano | 0.422 | | | | |
| 12 | Image | Plano | | | | | |

TABLE 6

Aspheric Coefficients

| | Surface # | | | | |
|---|---|---|---|---|---|
| | 1 | 2 | 4 | 5 | 7 |
| k = | −3.61827E+00 | −1.00000E+00 | 2.34991E+00 | 4.80509E+00 | −1.80143E+01 |
| A4 = | 1.42853E−01 | −1.14092E−01 | 5.40654E−03 | 7.68887E−02 | 6.65340E−02 |
| A6 = | −2.49310E−01 | −2.67101E−02 | 4.55536E−01 | 1.45374E−01 | −8.32263E−02 |
| A8 = | 4.64347E−01 | −4.49494E−01 | −5.82235E−01 | 1.35792E−01 | 2.92310E−02 |
| A10 = | −7.09956E−01 | 3.85751E−01 | 1.03560E+00 | 9.32809E−02 | −8.61967E−03 |
| A12 = | | | | | 1.66434E−03 |
| A14 = | | | | | −2.18982E−04 |

| | Surface # | | |
|---|---|---|---|
| | 6 | 8 | 9 |
| k = | −3.21854E−02 | −1.06356E+00 | −3.47029E+00 |
| A1 = | | | |
| A2 = | | | |
| A3 = | | | |
| A4 = | −1.04877E−01 | −6.32273E−01 | −2.93822E−01 |
| A5 = | | | |
| A6 = | 1.50127E−02 | 5.63406E−01 | 2.32183E−01 |
| A7 = | | | |
| A8 = | −2.79927E−02 | −3.55078E−01 | −1.20439E−01 |
| A9 = | | | |
| A10 = | 1.07764E−02 | 1.21075E−01 | 3.04996E−02 |
| A11 = | | | |
| A12 = | −3.48241E−03 | −1.97628E−02 | −3.78366E−03 |
| A13 = | | | |
| A14 = | | 1.22013E−03 | 2.21387E−04 |

Figure 4A:
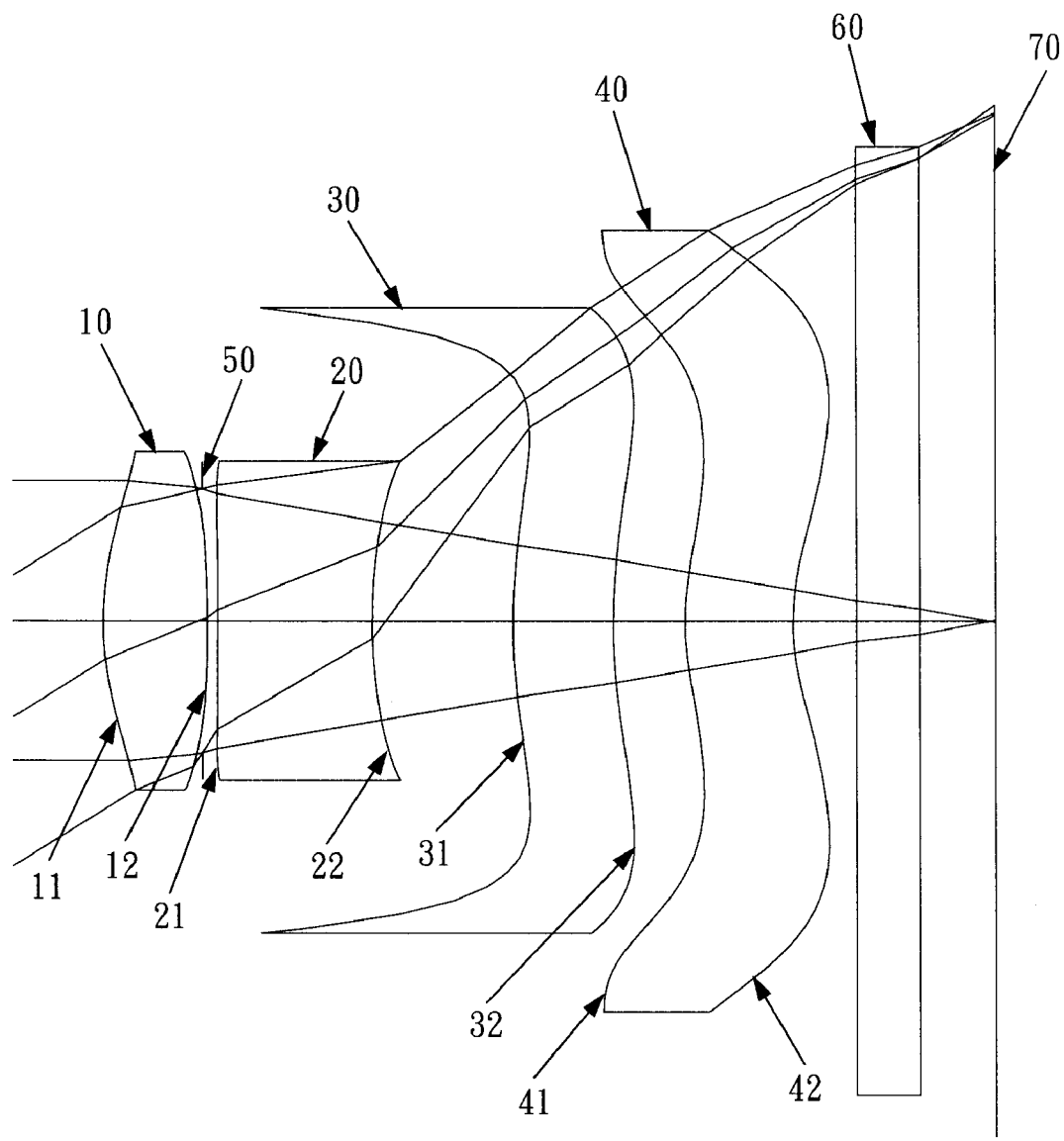
FIG. 4A shows an optical lens system for taking image in accordance with a fourth embodiment of the present invention.
Figure 4B:
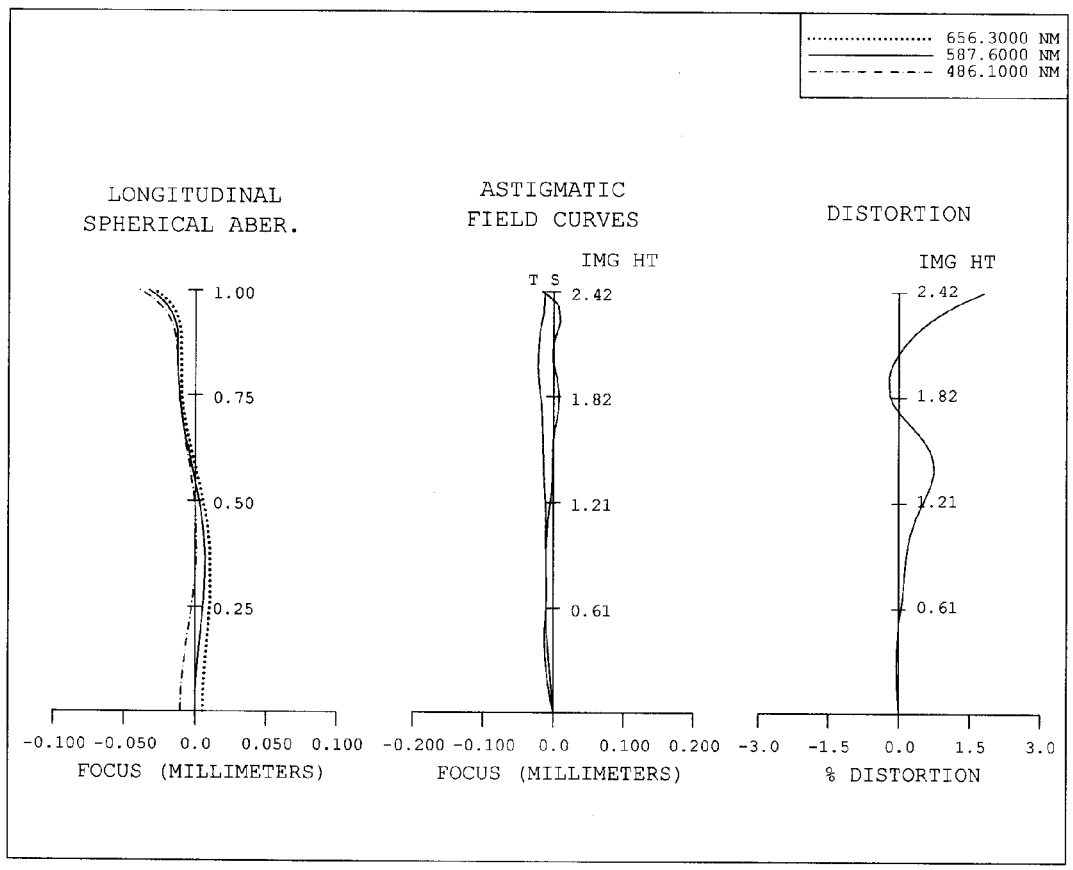
FIG. 4B shows the aberration curves of the fourth embodiment of the present invention.

Referring to FIG. 4A, which shows an optical lens system for taking image in accordance with a fourth embodiment of the present invention, FIG. 4B shows the aberration curves of the fourth embodiment of the present invention. The fourth embodiment of the present invention comprises: in order from the object side to the image side:

A plastic first lens element 10 with positive refractive power has a convex object-side surface 11 and a convex image-side surface 12, and the object-side surface 11 and the image-side surface 12 of the first lens element 10 are aspheric.

A plastic second lens element 20 with negative refractive power has a convex object-side surface 21 and a concave image-side surface 22, the object-side surface 21 and the image-side surface 22 of the second lens element 20 are aspheric, and inflection points are formed on the object-side surface 21 of the second lens element 20.

A plastic third lens element 30 with negative refractive power has a convex object-side surface 31 and a concave image-side surface 32, the object-side surface 31 and the image-side surface 32 of the third lens element 30 are aspheric, and inflection points are formed on the object-side surface 31 and the image-side surface 32 of the third lens element 30.

A plastic fourth lens element 40 with negative refractive power has a convex object-side surface 41 and a concave image-side surface 42, the object-side surface 41 and the image-side surface 42 of the fourth lens element 40 are aspheric, and inflection points are formed on the object-side surface 41 and the image-side surface 42 of the fourth lens element 40.

An aperture stop 50 is located between the first lens element 10 and the second lens element 20.

An IR cut filter 60 is located behind the fourth lens element 40 and has no influence on the focal length of the optical lens system.

An image plane 70 is located behind the IR cut filter 60.

The equation for the aspheric surface profiles of the fourth embodiment has the same form as that of the first embodiment.

In the fourth embodiment of the present optical lens system for taking image, the focal length of the optical lens system for taking image is f, the focal length of the third lens element is f3, and they satisfy the relations:

$f=3.75$ mm;

$|f/f3|=0.10$.

In the fourth embodiment of the present optical lens system for taking image, the focal length of the optical lens system for taking image is f, the on-axis distance between the first lens element and the second lens element is T12, the on-axis distance between the second lens element and the third lens element is T23, and they satisfy the relations:

$(T12/f)*100=1.3$ $(T23/f)*100=17.8$.

In the fourth embodiment of the present optical lens system for taking image, the refractive index of the first lens element is N1, and it satisfies the relation:

$N1=1.544$.

In the fourth embodiment of the present optical lens system for taking image, the Abbe number of the first lens element is V1, the Abbe number of the second lens element is V2, and they satisfy the relations:

$V2=23.4$;

$V1-V2=32.5$.

In the fourth embodiment of the present optical lens system for taking image, the radius of curvature of the object-side surface of the second lens element is R3, the radius of curvature of the image-side surface of the second lens element is R4, the radius of curvature of the object-side surface of the third lens element is R5, the radius of curvature of the image-side surface of the third lens element is R6, the radius of curvature of the object-side surface of the fourth lens element is R7, the radius of curvature of the image-side surface of the fourth lens element is R8, and they satisfy the relations:

$R3/R4=17.87$;

$R5/R6=1.22$;

$R7/R8=1.23$.

In the fourth embodiment of the present optical lens system for taking image, an object to be photographed is imaged on an electronic imaging sensor, the total track length of the system is TTL, the image height of the system is Imgh, and they satisfy the relation:

$TTL/ImgH=1.75$.

The detailed optical data of the fourth embodiment is shown in table 7, and the aspheric surface data is shown in table 8, wherein the units of the radius of curvature, the thickness and the focal length are expressed in mm, and HFOV is half of the maximal field of view.

TABLE 7

(Embodiment 4)

f(focal length) = 3.75 mm, Fno = 2.8, HFOV (half of field of view) = 32.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.64666(ASP) | 0.490 | Plastic | 1.544 | 55.9 | 2.61 |
| 2 | | −9.16500(ASP) | −0.026 | | | | |
| 3 | Aperture Stop | Plano | 0.076 | | | | |
| 4 | Lens 2 | 50.00000(ASP) | 0.733 | Plastic | 1.632 | 23.4 | −4.72 |
| 5 | | 2.79740(ASP) | 0.666 | | | | |
| 6 | Lens 3 | 3.03410(ASP) | 0.474 | Plastic | 1.544 | 55.9 | −37.46 |
| 7 | | 2.49560(ASP) | 0.343 | | | | |
| 8 | Lens 4 | 1.36512(ASP) | 0.512 | Plastic | 1.544 | 55.9 | −37.25 |
| 9 | | 1.10994(ASP) | 0.300 | | | | |
| 10 | IR-filter | Plano | 0.300 | Glass | 1.517 | 64.2 | |
| 11 | | Plano | 0.358 | | | | |
| 12 | Image | Plano | | | | | |

TABLE 8

Aspheric Coefficients

| | Surface # | | | | |
|---|---|---|---|---|---|
| | 1 | 2 | 4 | 5 | 7 |
| k = | −7.41945E+00 | −1.00000E+00 | −1.00000E+00 | −7.47594E+00 | −5.00000E+01 |
| A4 = | 1.40023E−01 | −2.84203E−01 | −2.00112E−01 | 5.80191E−02 | 6.00068E−02 |
| A6 = | −2.15228E−01 | 2.80117E−01 | 3.93072E−01 | 5.50929E−02 | −8.20842E−02 |
| A8 = | −1.66631E−02 | 4.53042E−02 | 6.98231E−02 | 6.02792E−02 | 2.65167E−02 |
| A10 = | −3.70623E−03 | −2.99683E−01 | −2.59688E−01 | 1.23563E−01 | −8.74730E−03 |
| A12 = | | | | −2.98268E−01 | 2.38291E−03 |
| A14 = | | | | 1.96156E−01 | −4.01475E−04 |
| A16 = | | | | | −2.70353E−05 |

| | Surface # | | |
|---|---|---|---|
| | 6 | 8 | 9 |
| k = | 1.13153E+00 | −7.97350E−01 | −3.87796E+00 |
| A1 = | | | |
| A2 = | | | |
| A3 = | | | |
| A4 = | −5.87055E−02 | −5.95051E−01 | −2.83270E−01 |
| A5 = | | | |
| A6 = | −3.03233E−02 | 5.41886E−01 | 2.26263E−01 |
| A7 = | | | |
| A8 = | −2.71474E−02 | −3.55590E−01 | −1.17136E−01 |
| A9 = | | | |
| A10 = | 2.89742E−02 | 1.22235E−01 | 3.04097E−02 |
| A11 = | | | |
| A12 = | −1.55168E−02 | −1.94964E−02 | −3.95892E−03 |
| A13 = | | | |
| A14 = | | 1.12350E−03 | 2.28758E−04 |

TABLE 9

| | Embodiment 1 | Embodiment 2 | Embodiment 3 | Embodiment 4 |
|---|---|---|---|---|
| f | 3.67 | 3.36 | 3.34 | 3.75 |
| Fno | 2.8 | 2.5 | 2.5 | 2.8 |
| HFOV | 33.0 | 35.5 | 35.8 | 32.5 |
| V2 | 23.4 | 23.4 | 30.2 | 23.4 |
| V1-V2 | 32.5 | 32.5 | 25.7 | 32.5 |
| N1 | 1.544 | 1.544 | 1.544 | 1.544 |
| (T12/f) * 100 | 2.0 | 8.5 | 11.1 | 1.3 |
| (T23/f) * 100 | 18.6 | 13.2 | 14.9 | 17.8 |
| |f/f3| | 0.05 | 0.10 | 0.05 | 0.10 |
| R3/R4 | 14.52 | 0.50 | 0.65 | 17.87 |
| R5/R6 | 1.16 | 1.24 | 1.13 | 1.22 |
| R7/R8 | 1.22 | 1.21 | 1.18 | 1.23 |
| TTL/ImgH | 1.76 | 1.66 | 1.63 | 1.75 |

In the present optical lens system for taking image, the lens elements can be made of glass or plastic. If the lens elements are made of glass, the freedom of distributing the refractive power of the optical lens system will be improved. If the lens elements are made of plastic, the cost will be effectively reduced.

It is to be noted that the tables 1-8 show different data from the different embodiments, however, the data of the different embodiments is obtained from experiments. Therefore, any product of the same structure is deemed to be within the scope of the present invention even if it uses different data. Table 9 lists the relevant data for the various embodiments of the present invention.

While we have shown and described various embodiments in accordance with the present invention, it is clear to those skilled in the art that further embodiments may be made without departing from the scope of the present invention.

What is claimed is:

1. An optical lens system for taking image comprising, in order from the object side to the image side:
   a first lens element with positive refractive power;
   a second lens element with negative refractive power;
   a third lens element with negative refractive power having a convex object-side surface and a concave image-side surface; and
   a fourth lens element with negative refractive power being provided with at least one aspheric surface, in the optical lens system for taking image, the number of lens elements with refractive power being limited to four.

2. The optical lens system for taking image as claimed in claim 1, wherein the second lens element is provided with at least one aspheric surface, and the third lens element is provided with at least one aspheric surface.

3. The optical lens system for taking image as claimed in claim 2, wherein an object-side surface of the first lens element is convex, an image-side surface of the fourth lens element is concave, the third lens element and the fourth lens element are made of plastic material, and inflection points are formed on the fourth lens element.

4. The optical lens system for taking image as claimed in claim 3, wherein an object-side surface of the second lens element is convex, and an image-side surface of the second lens element is concave.

5. The optical lens system for taking image as claimed in claim 4, wherein an object-side surface of the fourth lens element is convex.

6. The optical lens system for taking image as claimed in claim 5, wherein the first lens element is made of plastic material, the object-side surface and an image-side surface of the first lens element are aspheric, the second lens element is made of plastic material, the object-side surface and the image-side surface of the second lens element are aspheric, the object-side surface and the image-side surface of the third lens element are aspheric, inflection points are formed on the third lens element, the object-side surface and the image-side surface of the fourth lens element are aspheric, and the optical lens system for taking image further comprises an aperture stop which is located in front of the second lens element.

7. The optical lens system for taking image as claimed in claim 6, wherein inflection points are formed on the object-side surface of the second lens element.

8. The optical lens system for taking image as claimed in claim 4, wherein a focal length of the optical lens system for taking image is f, an on-axis distance between the second lens element and the third lens element is T23, and they satisfy the relation:

$(T23/f)*100>3.5.$

9. The optical lens system for taking image as claimed in claim 4, wherein a radius of curvature of the object-side surface of the second lens element is R3, a radius of curvature of the image-side surface of the second lens element is R4, and they satisfy the relation:

$R3/R4>3.0.$

10. The optical lens system for taking image as claimed in claim 4, wherein a focal length of the optical lens system for taking image is f, an on-axis distance between the first lens element and the second lens element is T12, and they satisfy the relation:

$0.6<(T12/f)*100<5.0.$

11. The optical lens system for taking image as claimed in claim 4, wherein a focal length of the optical lens system for taking image is f, a focal length of the third lens element is f3, and they satisfy the relation:

$|f/f3|<0.5.$

12. The optical lens system for taking image as claimed in claim 11, wherein the focal length of the optical lens system for taking image is f, the focal length of the third lens element is f3, and they satisfy the relation:

$|f/f3|<0.2.$

13. The optical lens system for taking image as claimed in claim 6, wherein a refractive index of the first lens element is N1, and it satisfies the relation:

$1.50<N1<1.58.$

14. The optical lens system for taking image as claimed in claim 6, wherein a radius of curvature of the object-side surface of the third lens element is R5, a radius of curvature of the image-side surface of the third lens element is R6, a radius of curvature of the object-side surface of the fourth lens element is R7, a radius of curvature of the image-side surface of the fourth lens element is R8, and they satisfy the relations:

$1.1<R5/R6<1.3;$ $1.1<R7/R8<1.3.$

15. The optical lens system for taking image as claimed in claim 6, wherein an Abbe number of the first lens element is V1, an Abbe number of the second lens element is V2, and they satisfy the relation:

$25.2<V1-V2<35.0.$

16. The optical lens system for taking image as claimed in claim 15, wherein the Abbe number of the first lens element is V1, the Abbe number of the second lens element is V2, and they satisfy the relations:

$30.6<V1-V2<34.0;$ $V2<25.0.$

17. The optical lens system for taking image as claimed in claim 1, wherein an object to be photographed is imaged on an electronic imaging sensor, a total track length of the optical lens system for taking image is TTL, an image height of the optical lens system for taking image is Imgh, and they satisfy the relation:

$TTL/ImgH<1.95.$

18. An optical lens system for taking image comprising, in order from the object side to the image side:
   a first lens element with positive refractive power having a convex object-side surface;
   a second lens element with negative refractive power having a concave object-side surface and a convex image-side surface, the second lens element being provided with at least one aspheric surface;
   a plastic third lens element with negative refractive power having a convex object-side surface and a concave image-side surface, the object-side surface and the image-side surface of the third lens element being aspheric; and
   a plastic fourth lens element with negative refractive power having a concave image-side surface, an object-side surface and the image-side surface of the fourth lens element being aspheric, inflection points being formed on the fourth lens element, in the optical lens system for taking image, the number of lens elements with refractive power being limited to four.

19. The optical lens system for taking image as claimed in claim 18, wherein a focal length of the optical lens system for taking image is f, a focal length of the third lens element is f3, and they satisfy the relation:

$|f/f3|<0.2.$

20. The optical lens system for taking image as claimed in claim 18, wherein a focal length of the optical lens system for taking image is f, an on-axis distance between the second lens element and the third lens element is T23, an on-axis distance between the first lens element and the second lens element is T12, and they satisfy the relations:

$(T23/f)*100>3.5;$ $(T12/f)*100>0.6.$

21. The optical lens system for taking image as claimed in claim 18, wherein an object to be photographed is imaged on an electronic imaging sensor, a total track length of the optical lens system for taking image is TTL, an image height of the optical lens system for taking image is Imgh, they satisfy the relation:

$TTL/ImgH<1.95;$ and the optical lens system for taking image further comprises an aperture stop which is located in front of the second lens element.

22. The optical lens system for taking image as claimed in claim 18, wherein the object-side surface of the fourth lens element is convex.

23. The optical lens system for taking image as claimed in claim 22, wherein the first lens element is made of plastic material, the object-side surface and an image-side surface of the first lens element are aspheric, the second lens element is made of plastic material, and the object-side surface and the image-side surface of the second lens element are aspheric.

24. The optical lens system for taking image as claimed in claim 23, wherein a radius of curvature of the object-side surface of the third lens element is R5, a radius of curvature of the image-side surface of the third lens element is R6, a radius of curvature of the object-side surface of the fourth lens element is R7, a radius of curvature of the image-side surface of the fourth lens element is R8, and they satisfy the relations:

$$1.1 < R5/R6 < 1.3;$$

$$1.1 < R7/R8 < 1.3.$$

25. The optical lens system for taking image as claimed in claim 23, wherein an Abbe number of the first lens element is V1, an Abbe number of the second lens element is V2, and they satisfy the relations:

$$25.2 < V1 - V2 < 35.0;$$

$$V2 < 25.0.$$

* * * * *